United States Patent
Barshefsky et al.

(10) Patent No.: US 6,393,101 B1
(45) Date of Patent: May 21, 2002

(54) METHOD AND APPARATUS FOR DETERMINING WHETHER THE ADVANCE STATE OF A TELECOMMUNICATIONS SWITCH IS ADEQUATE FOR A SOFTWARE UPGRADE

(75) Inventors: Alvin Barshefsky; Shao-Kuang Hu; Yao-Chung Hu; Murali Ramakrishnan, all of Naperville; John Frank Saban, Lisle; Rickey Joseph Spiece, Naperville; Charles Robert Strohm, Downers Grove, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/431,741

(22) Filed: Nov. 1, 1999

(51) Int. Cl.[7] .......................... H04M 1/24; H04M 3/08; H04M 3/22
(52) U.S. Cl. .................. 379/9.04; 379/32.01; 379/9
(58) Field of Search ............... 379/9, 9.01–9.04, 379/15.01, 15.02, 32.01, 230

(56) References Cited

U.S. PATENT DOCUMENTS 5,592,530 A * 1/1997 Brockman et al.
5,802,146 A * 9/1998 Dulman

* cited by examiner

Primary Examiner—Duc Nguyen
(74) Attorney, Agent, or Firm—The Hill Law Firm LTD

(57) ABSTRACT

A method is provided for determining whether the state of a telecommunications switch (110) is adequate for a software upgrade or retrofit. A report stream of text messages relating to the state of, and events occurring on, the telecommunications switch is stored (200) by a server (102). Predetermined messages are detected in the report stream, including messages indicating hardware errors, alarms and other errors (202). The predetermined messages have a numerical value associated therewith (204). The numerical value reflects a probability of failure of a retrofit if the message is detected. As the predetermined messages are detected, their numerical values are accumulated into an accumulated value (206). The time period the report stream covers is determined and compared against an expected time (216). If the time period covered by the report stream does not exceed an expected time, then a determination regarding suitability for upgrade may not be reliable (222). If the accumulated value exceeds a threshold, the switch may not be fit for the retrofit (228, 232). A visual portion (300, 400, 500, 600, 700, 800) of a user interface on a client (104) is updated to reflect whether the switch is in an adequate state for a software upgrade. Hierarchical views of a user interface permit a user to view a failing subsystem, failure type, and associated detected messages in an organized manner.

35 Claims, 7 Drawing Sheets

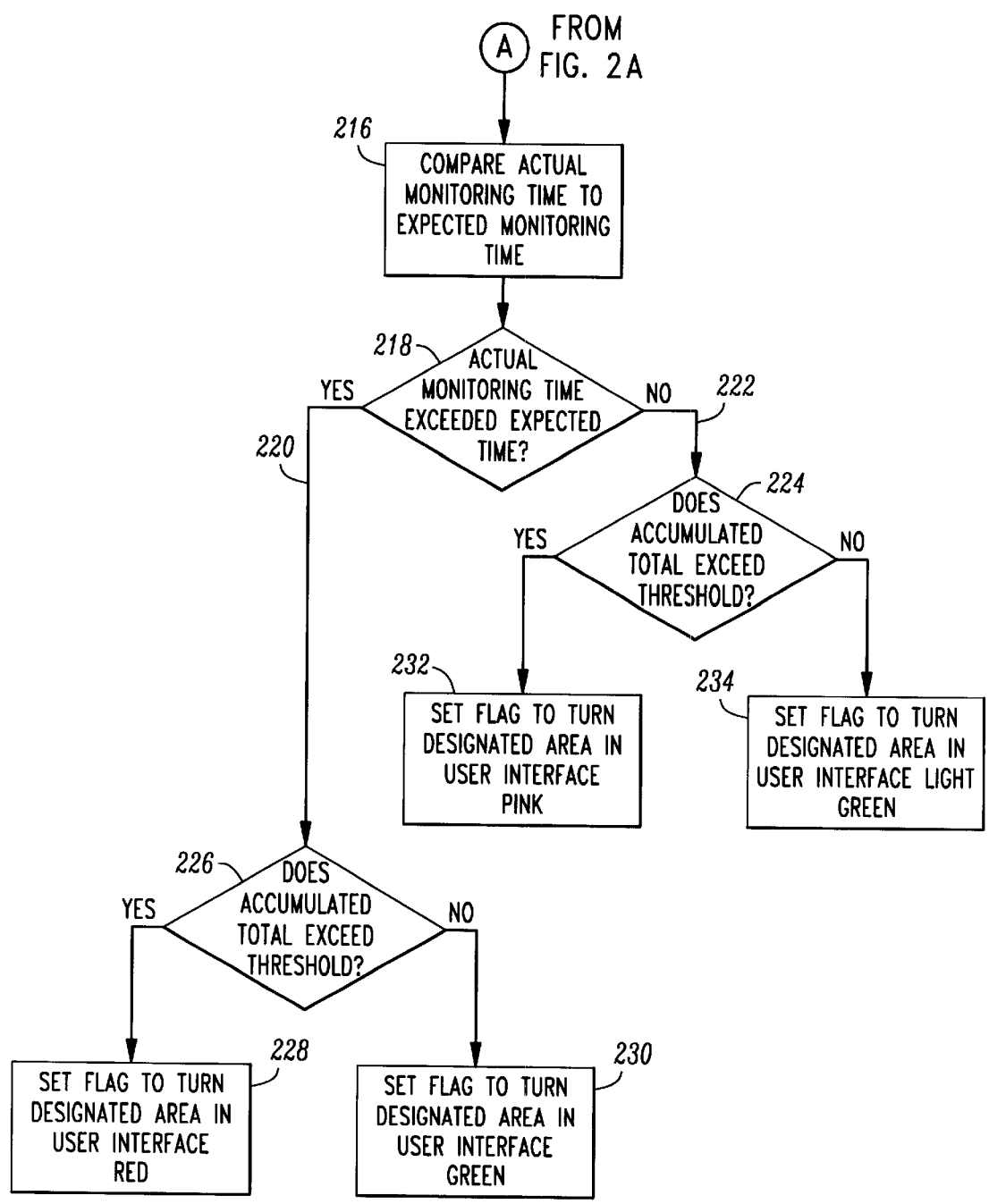

FIG. 5

| RETROFIT | 520 |
|---|---|
| RETROFIT CONDITION DATA - WEEK OF 1999-03-26-2749D0 OFFICE_X NV-SM TROUBLE | |
| SM | TOTAL WEIGHTED SCORE |
| SM18 | 100.002 |
| SM53 | .02 |
| SM65 | .016 |
| SM74 | .013 |
| SM45 | .009 |
| SM44 | .007 |

FIG. 6

| RETROFIT | | | |
|---|---|---|---|
| RETROFIT CONDITION DATA - WEEK OF 1999-03-26-2749D0 OFFICE_X -SM TROUBLE | | | |
| EVENT | COUNT | WEIGHT | SCORE |
| FULL INIT WITH PUMP | 1 | 100 | 100 |
| ASSERT | 2 | .001 | .002 |
| AUDIT | 0 | .001 | 0 |
| CGA | 0 | .5 | 0 |
| DIAGNOSIS-STF | 0 | 50 | 0 |
| FAC ALERT | 0 | .01 | 0 |

FIG. 7

| RETROFIT | |
|---|---|
| RETROFIT CONDITION DATA - WEEK OF 1999-03-26-2749D0 OFFICE_X - SM TROUBLE-SM18 | |
| FULL INIT WITH PUMP | DATE/TIME |
| MP FROM-MATE POWERUP | 1999-02-28 20:22:41 |

FIG. 8

```
┌─────────────────────────────────────────────────────────────────┐
│ RETROFIT                                                        │
├─────────────────────────────────────────────────────────────────┤
│ S570-53084298 99-02-28 20:22:41 859256 INT REN021F              │
│ REPT SM=18, 0, ACT HWLVL=13 SWLVL=F1, PUMP EVENT=2 COMPLETED    │
│   MP FROM-MATE POWERUP HW-ERR FAILING ADDR=H'0                  │
│   PROCESS: BG=65535, 0, PURGED CM=NONE, FG=NONE,,      802      │
├─────────────────────────────────────────────────────────────────┤
│                                              VIEW THE WHOLE ROP │
└─────────────────────────────────────────────────────────────────┘
                                                          ↖ 804
                    800 ↗
```

METHOD AND APPARATUS FOR DETERMINING WHETHER THE ADVANCE STATE OF A TELECOMMUNICATIONS SWITCH IS ADEQUATE FOR A SOFTWARE UPGRADE

CROSS-REFERENCE TO RELATED APPLICATIONS

The present invention is related to, and shares some disclosure with, U.S. patent application Ser. No. 09/430,983, entitled "Method and Apparatus for Analyzing the Progress of a Software Upgrade on a Telecommunications Switch," invented by Alexander et al., and U.S. patent application Ser. No. 09/430,903, entitled "Method and Apparatus for Determining Whether the Immediate State of a Telecommunications Switch is Adequate for a Software Upgrade," invented by Lilley et al., both of which are filed concurrently with the present application.

FIELD OF THE INVENTION

The present invention relates generally to telephone switching systems, and in particular, to a method and apparatus for analyzing the state of a telephone switching system in advance of a software upgrade to determine whether the software upgrade should be performed.

BACKGROUND OF THE INVENTION

Modern telephone switching systems are large-scale, highly complex systems incorporating one or more switching elements cooperatively controlled and supervised by one or more computing means. One commercial exemplar of a modern telephone switching system is the 5ESS ELECTRONIC SWITCHING SYSTEM, from Lucent Technologies Inc., 600 Mountain Avenue, Murray Hill, N.J. 07974. The 5ESS electronic switch is a distributed switching system. Both the switching system capabilities and the control, supervision and administration capabilities are distributed. Each of the computing facilities associated with these distributed capabilities includes appropriate computer programs or software to achieve the desired operation of the switching elements and other components of the switching system.

Periodically the software or computer programs used to control the components of the switching system are replaced by different software. This replacement of computer software is referred to as an upgrade or retrofit. The process of retrofitting a telephone switching system is complex. The complexity stems from the number of distributed computing facilities; the amount of software code involved; and the fact that the switching system availability must not be completely compromised for a retrofit. A typical retrofit of a switch may take from 10 to 12 hours. Resources must be employed days in advance of the retrofit for preparation. And, of course, additional resources are required during the retrofit.

Problems occurring during a retrofit are obviously undesirable. Unfortunately, problems do occur. Some of these problems are readily fixed. Other problems prevent successful upgrade of the switch. Regardless of the nature of the problem, early detection of the problem is desirable. Early detection allows for early correction or rescheduling to avoid wasted resources.

A report data stream is produced by the 5ESS switching system containing text messages regarding the current state and recent operations of the switching system. The report data stream includes messages that (1) describe the state of the switch hardware; (2) report automatic actions taken by the switch; (3) report operations entered by a switch operator; (4) report results of routine or scheduled diagnostics; and (5) indicate non-routine events, abnormal conditions, errors or alarms. The report data stream is typically supplied to a "read-only" printer or "ROP" via a serial port. Hence, the report data stream is often referred to as the "ROP" or "ROP" report. The report data stream is voluminous, sometimes generating 4 to 5 megabytes of data for storage a day. Therefore, the ROP is often stored on a computer to permit searching and review for problem solving. In addition, a telecommunications switch owner often desires to have all ROP output from its switches collected in a single location for review.

A successful software retrofit requires a switch to be in a specific state. For example, faulty hardware or an incomplete upgrade of hardware components may prevent a successful software retrofit. The state of the switch required for retrofit is not typically the same as the required state of the switch for normal operation. In particular, telecommunications switches typically have redundant or fault-tolerant components and subsystems that permit normal operation in spite of some faults. Therefore, an audit of the state of the switch, beyond the typical audits for normal operation, is required prior to a software retrofit. These audits traditionally are conducted manually and begin several days or weeks in advance of a scheduled retrofit.

The ROP, or its equivalent, is typically reviewed manually, or with the assistance of a computer, as a part of an audit prior to a software retrofit. However, given the voluminous nature of the ROP, especially when considering multiple switches and the vast period of time for which auditing is required, this method of auditing a switch prior to a retrofit is error prone and inefficient. Moreover, this method requires substantial subject matter expertise from a person manually reviewing the ROP.

Therefore, a need exists for a more efficient and reliable method and apparatus for auditing the state of a switch prior a software retrofit.

SUMMARY OF THE INVENTION

In accordance with the present invention, a method is provided for determining whether to proceed with a software upgrade on a telecommunications switch. First, a report stream from the switch is stored. The report stream includes messages associated with a state of the switch and relates to a predetermined period of time. In particular, the messages relate to the state of the hardware components of the switch. The report stream is searched for predetermined messages. The predetermined messages found in the search form a set of identified messages. Each predetermined message has a numerical value associated therewith. As predetermined messages are found in the report stream, an accumulated value is calculated by totaling up the numeric values for each identified message in the report stream. Based on the predetermined period of time covered by the report stream and whether the accumulated value exceeds a predetermined threshold, designations are stored for use by a user interface in alerting a user to whether the state of the switch is sufficient for a retrofit.

Preferably, a date and time for each occurrence of an identified message is stored and each identified message is also stored. The identified messages are grouped in relation to subsystems of the switch. The user interface provides hierarchical views of data relating to the determination of whether the accumulated value associated with the identified messages exceeds the predetermined threshold. At a first level in the user interface, a designated area is colored a predetermined color to indicate whether the accumulated value exceeds the predetermined threshold. Selecting a selectable area in the user interface reveals a second designated area, which indicates the groups or subsystems for which identified messages were found. Selecting a designated area associated with a particular subsystem reveals a third designated area that lists the identified messages and the value each message contributed to the accumulated value. The number of occurrences of the identified message is also preferably displayed. Selecting a designated area associated with the identified message causes the user interface to reveal another designated area showing the date and time for each occurrence of the identified message. Selecting a date and time stamp for an occurrence reveals yet another designated area that shows the text from the report stream of the switch that produced the identified message.

The stored report stream reflects activity for a predetermined period of time. The predetermined period of time is compared to an expected period of time. If the predetermined period of time does not exceed the expected period of time, then a designation is stored for a user interface to reflect this determination. In particular, the predetermined expected period of time is selected to ensure a sufficient audit of the report stream occurred. In other words, if the predetermined period of time does not exceed the expected period of time, then a favorable or unfavorable indication may not be accurate, due to a lack of information.

An apparatus in accordance with an aspect of the present invention includes a report memory, a processor and a user interface. The report memory stores a stream of messages from a telecommunications switch. Included within the stream of messages are messages reflecting the state of the telecommunications switch. The processor is coupled to the report memory. The processor searches the stream of messages for predetermined message streams to produce identified messages. Each identified message has a numerical value. The processor accumulates the numerical values for each identified message found in the report stream. The accumulated value is compared to a predetermined threshold. A user interface is coupled to the processor to reflect whether the accumulated value exceeds the predetermined threshold. Preferably, the processor compares the predetermined period of time covered by the report stream to an expected period of time. The user interface reflects whether the predetermined period of time exceeded the expected period of time. The expected period of time is a statistically valid measure of time for making a reliable decision from the report stream. The user interface provides hierarchical viewing of the identified messages and subsystems associated therewith as described above with respect to the method.

BRIEF DESCRIPTION OF THE DRAWINGS

FIGS. 2A–2B are a flow chart illustrating a method for determining whether the state of a switch is adequate for a software upgrade in accordance with the present invention.

FIG. 5 is a diagram showing another user interface display that is revealed in response to a selection made on the display shown in FIG. 4.

FIG. 6 is a diagram showing another user interface display that is revealed in response to a selection made on the display shown in FIG. 5.

FIG. 7 is a diagram showing another user interface display that is revealed in response to a selection made on the display shown in FIG. 6.

FIG. 8 is a diagram showing another user interface display that is revealed in response to a selection made on the display shown in FIG. 7.

DETAILED DESCRIPTION OF THE PREFERRED EMBODIMENTS

Figure 1:
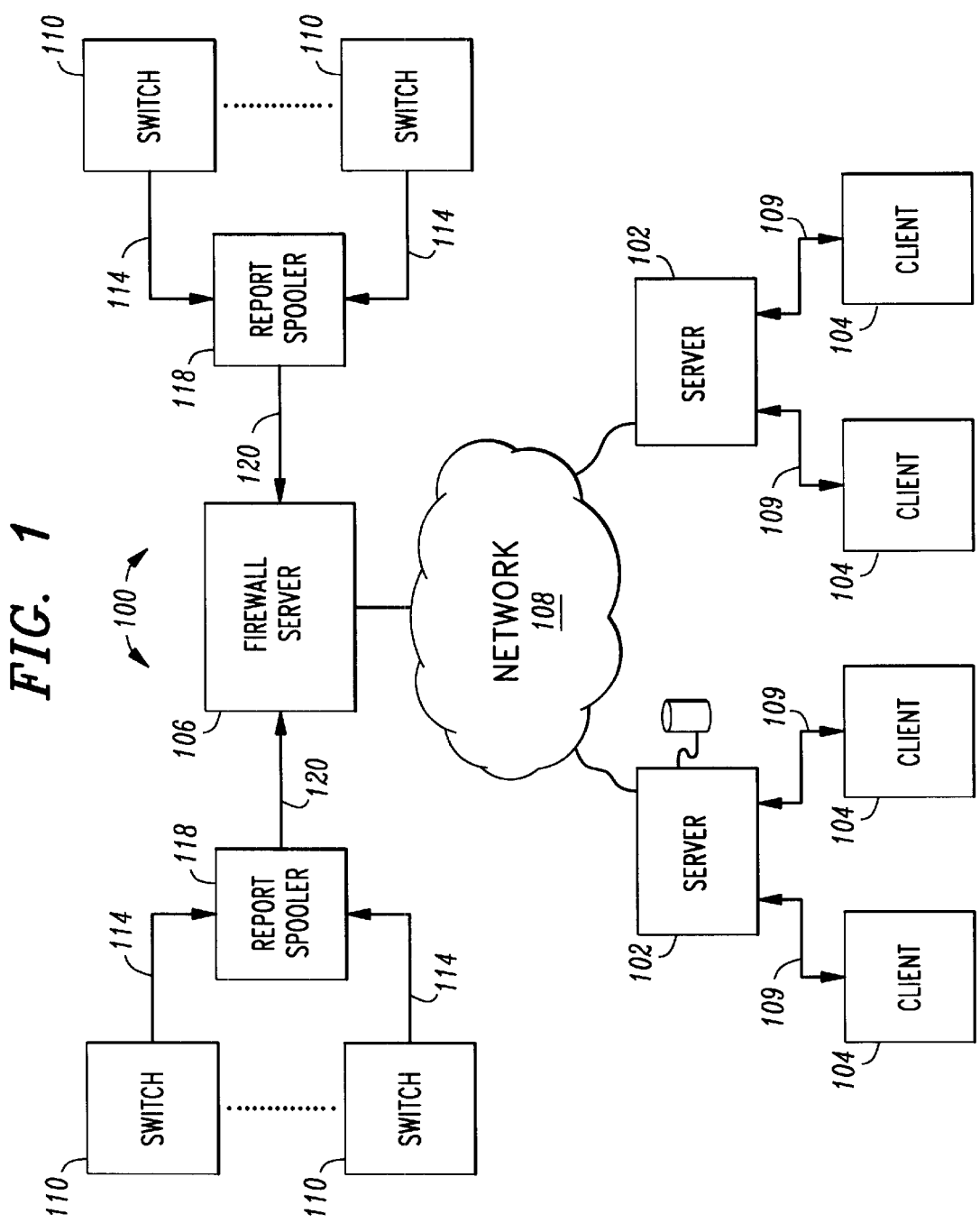
FIG. 1 is a block diagram of an apparatus for determining whether the advance state of a telecommunications switch is adequate for a software upgrade in accordance with the present invention.

FIG. 1 is a block diagram illustrating a system 100 for determining whether the advance state of a telecommunications switch is adequate for a software upgrade or retrofit in accordance with the present invention. System 100 includes servers 102, clients 104, firewall server 106 and network 108. Network 108 couples firewall server 106 and servers 102 together for data communications in a manner well known to those of skill in the art. Clients 104 are shown in FIG. 1 coupled to a server 102 directly by network connections 109. Alternatively, clients 104 are directly coupled to network 108. Firewall server 106, servers 102 and clients 104 are general-purpose computers programmed in a manner to implement the present invention, as described further below.

Telecommunications switches 110 are selectively coupled to system 100 to provide system 100 with information relating to the state of the telecommunications switches 110. More specifically, each telecommunications switch 110 produces a report stream 114. Report stream 114 is a serial stream of text messages reflecting the state of the telecommunications switch 110, including error messages, alarms, and other state information. Report streams 114 are coupled to report spoolers 118, which are preferably general-purpose computers for storing report streams 114. Report spoolers 118 are selectively coupled to firewall server 106 over network connections 120 to transfer the report streams to firewall server 106. Network connections 120 are preferably modem connections or Internet connections. Firewall server 106 has access to network 108. Network 108 is preferably an intranet network and firewall 106 serves to protect the integrity of network 108.

In the preferred embodiment, report spoolers 118 are coupled to firewall server 106 prior to a software upgrade to provide a report stream from switches 110. Alternatively, report spoolers 118 are directly coupled to network 108 and servers 102, though this alternative is less secure. Most preferably, report spoolers 118 are coupled to firewall server 106 to transfer 3 days of report streams in advance of both ten weeks and four weeks prior to a scheduled software upgrade. Most preferably, the firewall server automatically transfers the report streams to servers 102 at ten weeks and four weeks prior to a scheduled upgrade. The report streams are preferably compressed to conserve storage and decompressed prior to analysis.

Servers 102 and clients 104 analyze the report streams from switches 110 to determine whether the state of the switches is adequate for a software upgrade or retrofit. Servers 102 and clients 104 collectively provide a user interface that visually displays the results of the analysis of the report streams.

Firewall server 106 and servers 102 are preferably implemented as a single or multiple general-purpose computers.

For example, servers 102 are computers from Sun Microsystems, Inc., Palo Alto, Calif., such as the SUN ES6500 servers running the SUN SOLARIS operating system.

Figure 2A:
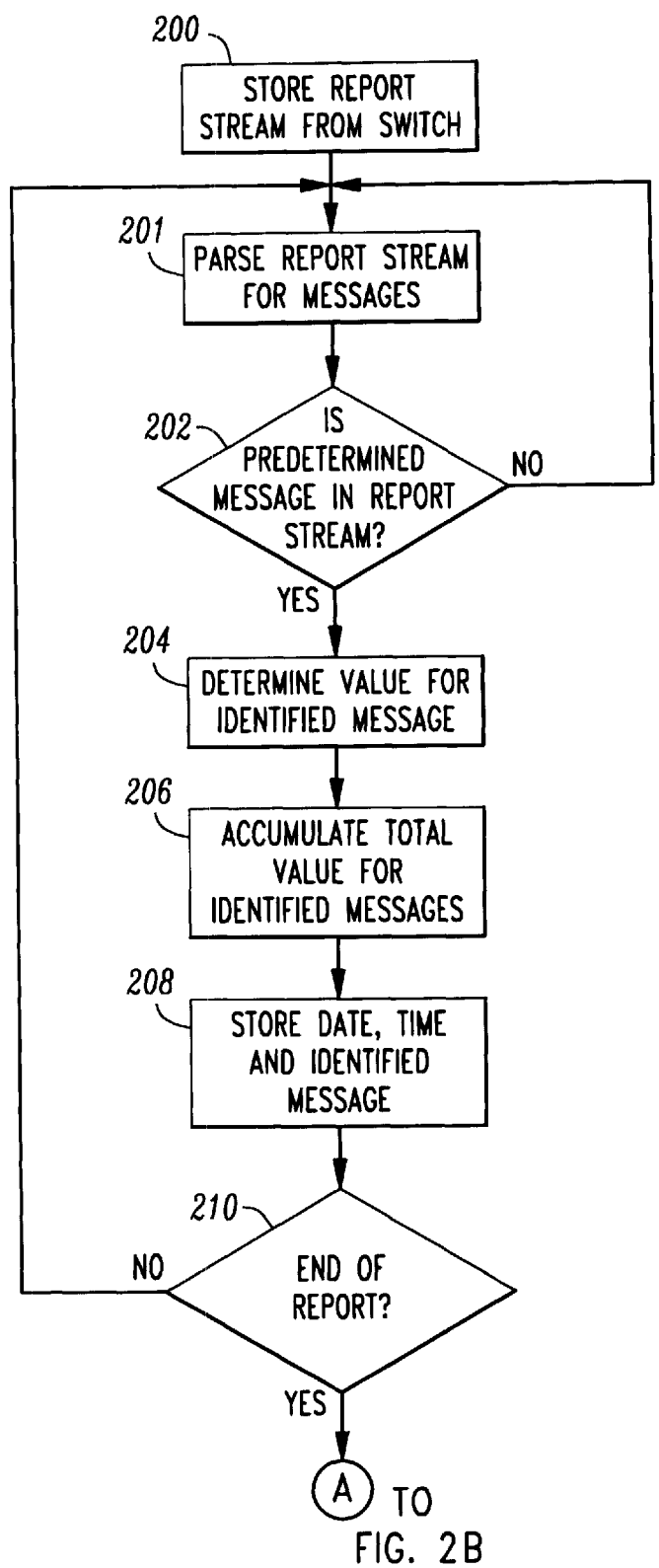

Clients 104 and report spoolers 118 are also preferably general-purpose computers with monitors and keyboards provided for engineers, technicians and others to interface with system 100. Most preferably, clients 104 are computers with a web browser, FIGS. 2A–2B are a flow chart illustrating a preferred method for determining whether the advance state of a telecommunications switch is adequate for a software upgrade in accordance with the present invention. First a report stream from the switch is stored (200). The report stream is stored in a manner and place for access by servers 102, for example, on firewall server 106 or on a server 102. The report stream includes a plurality of text messages associated with a state of the switch.

After the report stream is stored, the report stream is parsed or searched for predetermined messages (201). Identified messages are produced as a result of finding predetermined messages in the report stream (202). In other words, each predetermined message found in the report stream results in an identified message. Each identified message has a numerical value associated therewith. Preferably, a server 102 parses the report stream with reference to a database of predetermined messages. Most preferably, the database includes the numeric value or weight for each occurrence of the predetermined message.

The database also includes other data associated with the message such as the subsystem of the switch associated with the message and text that explains the meaning of the predetermined message. Preferably, the database is an ORACLE database that is available from Oracle Corporation, Redwood Shores, Calif.

Table 1 below list exemplary predetermined messages that are identified in the preferred embodiment associated with the 5ESS switching system. The "Item" column indicates an item name for the message. The "Group" column indicates the subsystem associated with the message. In the preferred embodiment, the subsystems are "AM" for the administrative module, "SM" for the switching module, "CM" for the communications module, land "CNI" for the common network interface. In the Group column, a "7" designates AM; "8" designates CM; "9" designates CNI; and "10" designates SM. The "Description" column includes a text message that is displayed in a user interface, as discussed below. The "Value" column indicates the numeric value or weight that is accumulated for an occurrence of the message. The actual message detected in the report stream is determined as "String1" OR "String2"(if present), where "String1" list a stream of text that occurs in the report stream; and "String2" list a stream of text that occurs in the report stream. The streams of text in String1 and String2 include symbols for parsing, such as don't cares, etc. The symbols follow the UNIX-style regular expression convention.

TABLE 1

| Item | Group | Description | Value | String1 | String2 |
|---|---|---|---|---|---|
| AM Assert | 7 | AM Assert (Defensive Check Failure) | 0.001 | AM LVL=* DEF-CHK-FAIL=* | |
| AM Audit | 7 | AM Audit | 0.001 | AUD ENV=* | |
| CM Assert | 8 | CM Assert (Defensive Check Failure) | 0.001 | INIT CMP=* LVL=* | |
| CM Audit | 8 | CM Audit | 0.001 | AUD CMP=* | |
| MSCU DGN | 8 | Message Switch Control Unit Diagnosis failure | 25 | DGN MSCU STF | |
| PPC DGN | 8 | Pump Peripheral Controller Diagnosis failure | 25 | DGN PPC STF | |
| FPC DGN | 8 | Foundation Peripheral Controller Diagnosis failure | 25 | DGN FPC STF | |
| MMP DGN | 8 | Module Message Processor Diagnosis failure | 25 | DGN MMP STF | |
| ONTCCOM DGN | 8 | Common Office Network Timing Complex hardware Diagnosis failure (ONTCCOM) | 25 | DGN ONTCCOM STF | |
| TMS DGN | 8 | Time-Multiplexed Switch Diagnosis failure | 25 | DGN TMS | |
| NC DGN | 8 | Network Clock Diagnosis failure | 25 | DGN NC | |
| MI DGN | 8 | Message Interface diagnosis failure | 25 | DGN MI | |
| LI DGN | 8 | Link Interface Diagnosis failure | 25 | DGN LI | |
| CNI Assert | 9 | CNI Assert (Defensive Check Failure) | 0.001 | INIT DLN=* LVL=* | |
| CNI Audit | 9 | CNI Audit | 0.001 | AUD ENV=*LKBDST | |

TABLE 1-continued

| Item | Group | Description | Value | String1 | String2 |
|---|---|---|---|---|---|
| DFI DGN | 10 | Digital Facility Interface diagnosis failure | 25 | DGN DFI=*F17 STF | |
| DKDRV | 7 | Disk driver error | 1 | REPT DKDRV | |
| IODRV | 7 | Seek AM support assistance | 1 | REPT IODRV | |
| SIMCHK | 7 | Link-related. Comes in pairs (usually). Excessive amount indicates bad links. Allowing 10 pairs of messages. | 1 | REPT SIMCHK | |
| CNI Ring | 9 | Seek assistance from CNI/CCS support | 1 | ^\*[C\*] REPT CNI RING | |
| CNCE | 9 | Major or Critical CNCE. Seek CCS technical assistance. | 1 | ^\*[C\*] REPT CNCE | |
| CNCE (MINOR) | 9 | Minor alarm CNCE. | 1 | ^\* REPT CNCE | |
| CNI INIT | 9 | CNI Initialization | 100 | \*[C\*] INIT CNI | |
| REPT TRBL (CRITICAL) | 8 | Critical alarm CM trouble. Limit 5, Seek assistance from CM support. | 1 | \*C REPT TRBL, | |
| REPT TRBL (MAJOR) | 8 | Major alarm CM trouble. Limit 10, Seek assistance from CM support. | 1 | \*\* REPT TRBL, | |
| REPT TRBL (MINOR) | 8 | Minor alarm CM trouble. Limit 20. Seek assistance from CM support. | 1 | ^\* REPT TRBL, | |
| REPT TRBL (NO ALARM) | 8 | No-alarm CM trouble. Limit 100. Seek assistance from CM support. | 1 | REPT TRBL, | |
| DFC DGN | 7 | Seek AM support assistance | 25 | DGN DFC* STF | |
| MHD DGN | 7 | Seek AM support assistance | 25 | DGN MHD* STF | |
| CU DGN | 7 | Seek AM support assistance | 25 | DGN CU* STF | |
| IOP DGN | 7 | Seek AM support assistance | 25 | DGN IOP* STF | |
| MT DGN | 7 | Seek AM support assistance | 25 | DGN MT* STF | |
| MCTSI DGN | 10 | Seek SM support assistance | 25 | DGN MCTSI=* STF | |
| PSUPH DGN | 10 | Seek SM support assistance | 25 | DGN PSUPH=* STF | |
| PSUCOM DGN | 10 | Seek SM support assistance | 25 | DGN PSUCOM=* STF | |
| LDSUCOM DGN | 10 | Seek SM support assistance | 25 | DGN LDSUCOM=* STF | |
| DNUS DGN | 10 | Seek SM support assistance | 25 | DGN DNUSC[CD]=* STF | |
| CMP DGN | 8 | Seek CM support assistance | 25 | DGN CMP=* STF | |
| DLI DGN | 8 | Seek CM support assistance | 25 | DGN DLI=* STF | |
| NLI DGN | 8 | Seek CM support assistance | 25 | DGN NLI=* STF | |
| QGP DGN | 8 | Seek CM support assistance | 25 | DGN QGP=* STF | |
| QLPS DGN | 8 | Seek CM support assistance | 25 | DGN QLPS=* STF | |
| OFLBOOT | 7 | Seek AM or LOT support assistance | 1 | EXC OFLBOOT ABORTED | EXC OFLBOOT TERMINATED |
| OFFLINE BOOT | 7 | Seek AM or LOT support assistance | 1 | EXC OFLINE BOOT TERMINATED | EXC OFLINE BOOT ABORTED |
| REPT OFLBOOT | 7 | Seek AM or LOT support assistance | 1 | REPT OFLBOOT ABORTED | REPT OFLBOOT TERMINATED |
| OFL BOOT ERR | 7 | Seek AM or LOT support assistance | 1 | REPT OFLBOOT ERR | |
| AM INIT | 7 | Full or Selective Init | 100 | INIT AM.*LVL=[FS]I | |

TABLE 1-continued

| Item | Group | Description | Value | String1 | String2 |
|---|---|---|---|---|---|
| CMP PRIM INIT | 8 | Full or Selective Init. | 100 | INIT CMP=0-PRIM.*LVL=[FS]I | |
| SM SPP | 10 | SM Single Process Purge, Will interfere with offline pump. Seek SM support assistance. | 1 | INIT SM=.*LVL=SPP | REPT SM=.*LVL=SPP.* COMPLETED |
| SM INITIALIZATION | 10 | SM Initialization, Seek SM support assistance | 100 | REPT SM=.*LVL=[FS]I | |

Table 2 below gives a message description for each of the "Items" in Table 1.

TABLE 2

| Item | Message Description |
|---|---|
| AM Assert | Reports Asserts related to AM |
| AM Audit | Reports Audits related to AM |
| CM Assert | Reports Asserts related to CM |
| CM Audit | Reports Audits related to CM |
| MSCU DGN | To respond to a manual or automatic request to diagnose a specific Message Switch Control Unit (MSCU) |
| PPC DGN | To respond to a manual or automatic request to diagnose a specific Pump Peripheral Controller (PPC) |
| FPC DGN | To respond to a manual or automatic request to diagnose a specific Foundation Peripheral Controller (FPC) |
| MMP DGN | To respond to a manual or automatic request to diagnose a specific Module Message Processor (MMP) |
| ONTCCOM DGN | To respond to a manual or automatic request to diagnose a specific Common Office Network Timing Complex (ONTCCOM) |
| TMS DGN | To respond to a manual or automatic request to diagnose a specific time multiplexed switch (TMS) |
| NC DGN | To respond to a manual or automatic request to diagnose a specific network clock (NC). |
| MI DGN | To respond to a manual or automatic request to diagnose a specific message interface unit (MI) |
| LI DGN | To acknowledge a manual or automatic request to remove and diagnose a specific link interface (LI) |
| CNI Assert | Reports Asserts related to CNI (Common Network Interface) Ring |
| CNI Audit | Reports Audits related to CNI Ring |
| DFI DGN | Digital Facility Interface diagnostic failure |
| DKDRV | Reports illegal operations requested from Disk File Controller, DFC not in ready state, DFC internal software or hardware error(s) |
| IODRV | Reports internal software error from IOP (Input-Output Processor) |
| SIMCHK | Indicative of links to remote systems going up and down. Will affect realtime performance of AM processor. |
| CNI Ring | Reports the CNI ring is unable to handle traffic after an initialization |
| CNCE | Major alarm CNI Critical Event (CNCE) |
| CNCE (MINOR) | Minor alarm CNI Critical Event (CNCE), less weight. |
| CNI INIT | Reports a manual or automatic CNI ring initialization. |
| REPT TRBL (CRITICAL) | Critical alarm Communications Module (CM) action taken |
| REPT TRBL (MAJOR) | Major alarm Communications Module (CM) action taken, less weight |
| REPT TRBL (MINOR) | Minor alarm Communications Module (CM) action taken, even less weight. |
| REPT TRBL (NO ALARM) | No-alarm Communications Module (CM) action taken, even less weight yet |

TABLE 2-continued

| Item | Message Description |
|---|---|
| DFC DGN | Failing diagnostic on Disk File Controller |
| MHD DGN | Failing diagnostic on Moving Head Disk |
| CU DGN | Failing diagnostic on Control Unit (CPU of AM) |
| IOP DGN | Failing diagnostic on Input/Output Processor complex |
| MT DGN | Failing diagnostic on Magnetic Tape Unit |
| MCTSI DGN | Failing diagnostic on SM module controller time slot interchange unit |
| PSUPH DGN | Failing diagnostic on SM module packet switch unit packet handler card |
| PSUCOM DGN | Failing diagnostic on SM module packet switch unit common control unit |
| LDSUCOM DGN | Failing diagnostic on SM module local digital service unit (tone generators and receivers) |
| DNUS DGN | Failing diagnostic DNUS control or data circuitry |
| CMP DGN | Failing diagnostic on CMP controller |
| DLI DGN | Failing diagnostic on dual link interface |
| NLI DGN | Failing diagnostic on network link interface |
| QGP DGN | Failing diagnostic on QLPS gateway processor |
| QLPS DGN | Failing diagnostic on quad-link packet switch |
| OFLBOOT | Offline boot operation in AM took a fault |
| OFFLINE BOOT | Offline boot operation in AM took a fault |
| REPT OFLBOOT | Offline boot operation in AM took a fault |
| OFL BOOT ERR | Offline boot operation in AM took a fault |
| AM INIT | AM processor took full or selective initialization |
| CMP PRIM INIT | CMP processor took full or selective initialization |
| SM SPP | An SM process was killed unexpectedly |
| SM INITIALIZATION | An SM took full or selective initialization |

The numeric value for the identified message is determined (204) by retrieving the value from the database. Then an accumulated total is determined (206). The accumulated total is the sum of all the values for each identified message in the message stream. For example, with reference to Table 1, if a report stream contains two CM Assen (row 3) items and one MSCU DGN (row 5) item, the accumulated total is 25.002, that is 0.001+0.001+25. String1 and String2 of rows 3 and 5 of Table 1 define the text received in the report stream. Most preferably the accumulated totals are calculated per subsystem.

In addition to keeping an accumulated total(s), the actual report stream message that included a predetermined message or "item" is stored in a log file along with the time and date stamp from the report stream (208). The log file is used for subsequent problem diagnosis and analysis in conjunction with the user interface, as discussed below.

Parsing of the report stream and the associated processing for identified messages (201, 202, 204, 206, 208) continues until the end of the report stream is reached (210). Once the end of the report stream is reached, the actual monitoring time is determined and compared to an expected period of time (216). More specifically, the date and time associated with the first and last messages in the report stream indicate the time period covered by the report stream. An expected period of monitoring is determined based on experience with the monitoring process. The expected period of time is selected to insure adequate monitoring or data collection for a reliable determination of whether the state of the switch is adequate for a retrofit. Preferably, the expected period of time is at least 55 hours.

If the actual monitoring time exceeds the expected monitoring time (218), then a reliable determination is made regarding the state of the switch for the monitoring time period (220). If on the other hand, the actual monitoring time period does not exceed the expected period of time (218), then a legs reliable determination is made regarding the state of the switch during the monitoring time period (222). In either case, the accumulated value is compared against a threshold (224, 226). The threshold is predetermined for an accumulated value that is unacceptable. This threshold is typically based on experience associated with problems or state conditions that identify problems that hinder an upgrade or retrofit. In a preferred embodiment that uses the exemplary messages listed in Table 1 above, the threshold is set at 100 per subsystem such that any subsystem over 100 exceeds the threshold. In the case where monitoring exceeds the expected time and the accumulated value exceeds the threshold, a flag is set to turn a designated area in a user interface red (228). This indicates a "no go" decision regarding the retrofit, which warns a user that further detailed analysis is required. In the case where monitoring exceeds the expected time and the accumulated value does not exceed the threshold, a flag is set to turn a designated area in a user interface green (230). This indicates a "go" decision regarding the retrofit. In the case where monitoring does not exceed the expected time and the accumulated value exceeds the threshold, a flag is set to turn a designated area in a user interface pink or light red (232). This indicates a "provisional no go" decision regarding the retrofit. In the case where monitoring does not exceed the expected time and the accumulated value does not exceed the threshold, a flag is set to turn a designated area in a user interface light green (234). This indicates a "provisional go" decision regarding the retrofit. Of course the colors used for the designations may vary.

The method described above is preferably implemented with software running on servers 102. The core monitoring application is preferably a service written in C++, SQL, and HTML. This core monitoring application parses the report stream and stores data associated therewith as described above. Internal communications between applications is preferably accomplished using TCP/IP sockets. Data used to control the application, e.g., the predetermined messages, and data stored from the application, e.g., the identified messages, are stored in a database. A middleware, for example, COLD FUSION, from Alliare Corp., Cambridge, Mass., using SQL, HTML technology provides application access to the database.

Figure 3:
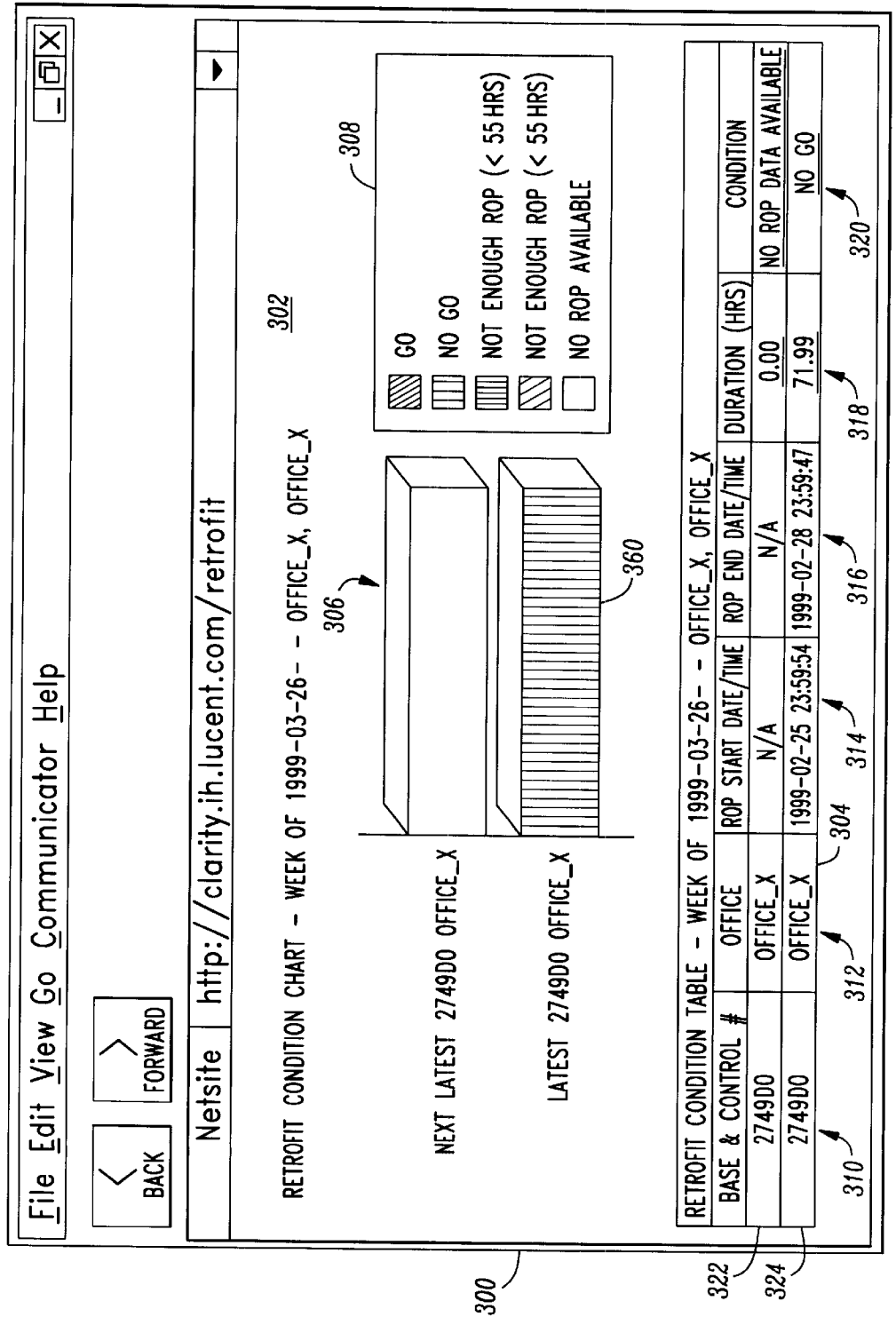
FIG. 3 is a diagram showing a user interface display in accordance with the present invention.

FIG. 3 is a diagram illustrating a visual portion of a user interface for displaying the results of a determination of whether the advance state of a telecommunications switch is adequate for a software upgrade in accordance with the present invention. Preferably, the user interface is implemented on a client 104. Client 104 preferably has software that accesses the database on a server 102 and reflects changes made in the database in a visually aesthetic manner. Preferably, the user interface is displayed on a computer monitor. Most preferably, the user interface is a web browser that couples to the database and servers over an intranet in a manner known to those of skill in the art.

Display 300 is a consolidated status display. Display 300 collectively shows in one screen the status of multiple switches or offices scheduled for a software upgrade or shows the results of multiple report stream analysis for a particular office or switch. The contents of display 300 are preferably chosen in another display in the user interface that permits selection of: (1) a geographical region; (2) a scheduled retrofit date or week; (3) a particular office or group of offices; and (4) the latest ROP (~4 weeks), the next latest ROP (~10 weeks) or both the latest and next latest ROP.

A chart 302 and a table 304 characterize the display 300. Chart 302 includes a bar graph 306 and a legend 308. Bar graph 306 illustrates a bar associated with each report stream analyzed. Legend 308 gives the colors associated with the results of the determination of whether to proceed with a retrofit. Table 304 has columns 310, 312, 314, 316, 318 and 320. Column 310 indicates the base and control number for the office or switch; column 312 indicates the office name; column 314 indicates the report stream start date and time; column 316 indicates the report stream end date and time; column 318 indicates the duration of the report stream in hours; and column 320 indicates the condition determined from and analysis of the report stream, that is, the decision regarding whether a retrofit should proceed. Rows 322, 324 are associated with a particular report stream.

Display 300 shows an analysis for a switch designated "Office_X." Two bar graphs are shown to reflect a report stream relating to approximately ten weeks and a report stream relating to approximately four weeks prior to the scheduled upgrade. Actually, as noted in table 304 and as illustrated in bar graph 306, no report stream data is available for a report expected at ten weeks prior to the retrofit. A white bar, as indicated in legend 308, gives a visual indication of "No ROP;" that is, no report stream is available. As is common in user interfaces generally, and in particular in intranet and Internet user interfaces, certain data in the interface includes links that are coupled to the user interface upon selection. The data in rows 322, 324 under columns 318, 320 are underlined to indicate links. The links under the condition column 320 provide additional information regarding the results of the determination of whether the switch state is adequate for a retrofit. In particular, a "no go" indication is listed in column 320, row 324, indicating that the report stream for Feb. 25–28, 1999 had identified messages that exceeded a threshold.

Display 300 gives an immediate visually perceptible indication of the results of the determination of whether to proceed with the retrofit, that is, the "health check." For example, bar 360 is colored red to indicate that the switch designated Office_X did not pass the health check. Also, the condition column 320 list the health check result. Display 300 does not provide any details regarding the cause of failure of the health check. Further details are made available about the health check by selecting the "no go" text, for example, by double clicking on "no go" with a mouse or other pointing device. The further details are provided hierarchically by displaying an additional level of detail in another display in the user interface.

Figure 4:
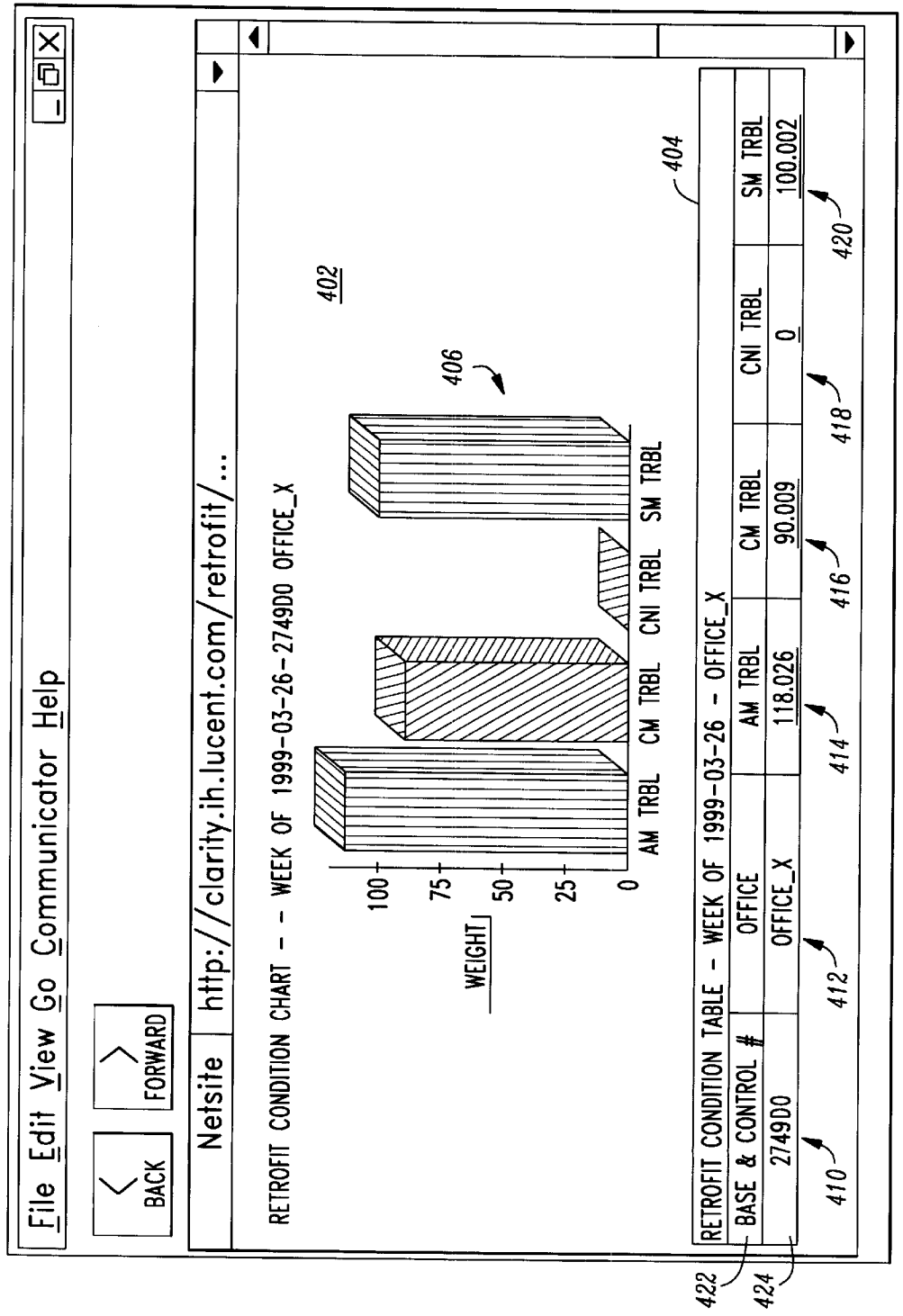
FIG. 4 is a diagram showing another user interface display that is revealed in response to a selection made on the display shown in FIG. 3.

FIG. 4 illustrates a display 400 that is made visually perceptible in response to a user selecting the "no go" text in display 300. A chart 402 and a table 404 characterize the display 400. Chart 402 includes a bar graph 406. Bar graph 406 illustrates a bar associated with each subsystem of the switch for the selected report stream. Each bar rises to a height representing an accumulated value for a subsystem. Table 404 has columns 410, 412, 414, 416, 418 and 420. Column 410 indicates the base and control number for the office or switch; column 412 indicates the office name; column 414 indicates the accumulated value for identified messages associated with the AM subsystem; column 416 indicates the accumulated value for identified messages associated with the CM subsystem: column 418 indicates the accumulated value for identified messages associated with the CNI subsystem; and column 420 indicates the highest accumulated value for identified messages associated with a particular switching module of the SM subsystem. The SM subsystem is treated somewhat differently from the AM, CM, and CNI subsystems, because the SM subsystem is composed of sub subsystems, namely, the individual switching modules that comprise the SM subsystem. The correlation between messages and subsystems is discussed above with respect to Table 1. Row 422 lists the headings for each column and row 424 lists the actual data for the selected switch, in this example, Office_X.

Display 400 permits a user to identify a subsystem(s) that caused the health check to fail and the total accumulated value associated with each subsystem. Bar graph 406 graphically shows the accumulated value attributed to each subsystem. A bar represents each subsystem and the bars are preferably colored to reflect a failing subsystem. Most preferably, a subsystem with an accumulated value greater than the threshold is colored red and a subsystem with an accumulated value less than the threshold is colored green. Additional details regarding any subsystem are obtained by selecting the value of the subsystem area. For example, additional details regarding the SM subsystem are displayed by selecting the value "100.002" found at the intersection of column 420 and row 424.

FIG. 5 illustrates a portion of a display 500 that is made visually perceptible in response to a user selecting value "100.002" in display 400. Display 500 includes column 502 and column 504. Column 502 is entitled "SM" and list the particular switching module associated with the identified messages, as discussed above with respect to Table 1. Column 504 is entitled "Total Weighted Score" and list the accumulated value associated with the particular switching module, as determined by the messages identified during the monitoring of the ROP. The switching modules are designated by a number. Most preferably, the switching modules are listed in order by accumulated value with the highest value listed first. For example, SM18 is the switching module of the SM subsystem with the highest accumulated value, 100.002, which is the value shown for the SM subsystem in display 400.

Display 500 permits a user to identify the switching modules and associated values for the subsystem selected. In other words, the accumulated values of a sub subsystem of a subsystem are displayed. The office or switch is identified in display 500 in row 520. As in the previous display, the values are links to additional details. For example, by selecting "100.002" additional details are revealed.

FIG. 6 illustrates a display 600 that is made visually perceptible in response to a user selecting "100.002" in display 500. A display analogous to display 600 is revealed in response to links in columns 414, 416, and 418 in FIG. 4 relating to the AM, CM, and CNI subsystems, which are not further divided into sub subsystems. Display 600 includes column 602, column 604, column 606 and column 608. Column 602 is entitled "Event" and lists a text message associated with the identified message. The text in the Event column may be the item, the item description or another category based on the identified message. The Event column gives a user an indication of the event associated with a message and may be identified by text in the report stream in addition to "String1" and "String2" listed above in Table 1. Column 604 is entitled "Count" and lists the number of occurrences of the Event. Numbers other than zero in the count column are underlined to indicate a link to additional details. Column 606 is entitled "Weight" and lists the value that is accumulated for a single occurrence of the Event. The "Score" column 608 lists the score for the event, which is the count times the weight. Additional details regarding a particular occurrence of an event are obtained by selecting the area containing the count for the event. For example, additional details regarding the "Full Init with Pump" event are revealed by selecting "1" under the count column 604.

FIG. 7 illustrates a display 700 that is made visually perceptible in response to a user selecting "1" in the count column 604 in display 600. Display 700 includes a column 702 and a column 704. Column 702 is entitled the name of the event selected, in this example, "Full lnit with Pump" and contains select text related to, or from the report stream message that resulted in the event. Column 704 is entitled "Date/Time" and displays a date and a time for each occurrence of the selected event. One occurrence of "Full Init with Pump" is shown in FIG. 7, reflecting the one occurrence of that event on Feb. 28, 1999 at 8:22 PM. Additional details regarding a particular occurrence of a message are obtained by selecting the area containing the date and time for the event. For example, additional details regarding the event occurring on Feb. 28, 1999 at 8:22 PM are displayed in response to selecting the date and time, which are underlined.

FIG. 8 illustrates a display 800 that is made visually perceptible in response to a user selecting a date and time in display 700. Display 800 includes a text pane 802 that list the ROP output that resulted in an identified message and event. Display 800 permits a user to see the ROP output that caused a particular message that resulted in an event. A button 804 is displayed for selecting to see the entire ROP output.

The present invention provides a method and apparatus for efficient auditing of the state of a telecommunications switch prior to a software upgrade. The audit or "health check" determines the suitability of the switch for a software upgrade. The results of the health check are conveyed to a user in a hierarchical manner allowing a user to examine events of interest in an organized and efficient manner.

The invention being thus described, it will be evident that the same may be varied in many ways. Such variations are not to be regarded as a departure from the spirit and scope of the invention and all such modifications are intended to be included within the scope of the appended claims.

What is claimed is:

1. A method for determining whether to proceed with a software upgrade on a switch comprising the steps of:

A) storing a report stream from the switch, wherein the report stream includes a plurality of messages associated with a state of the switch, and wherein the report stream relates to a predetermined period of time;

B) searching the report stream for predetermined messages to produce identified messages, wherein each identified message has a numerical value;

C) accumulating the numerical value for each identified message to produce an accumulated value; and D) determining whether the accumulated value exceeds a predetermined threshold.

2. The method of claim 1 further comprising the step of:
E) updating a user interface to reflect whether the accumulated value exceeds the predetermined threshold.

3. The method of claim 2 further comprising the steps of:
F) comparing the predetermined period of time to an expected period of time; and
G) updating the user interface to reflect whether the predetermined period of time exceeded the expected period of time.

4. The method of claim 1 further comprising the step of:
E) storing a date and time associated with each identified message.

5. The method of claim 4 further comprising the step of:
F) storing each identified message.

6. The method of claim 3 wherein the user interface includes a first designated area to reflect whether the accumulated value exceeds the predetermined threshold, wherein the first designated area is visually perceptible.

7. The method of claim 6 wherein the first designated area is colored a first predetermined color to reflect that the accumulated value exceeded the predetermined threshold and the predetermined period of time exceeded the expected period of time.

8. The method of claim 7 wherein the first designated area is colored a second predetermined color to reflect that the accumulated value did not exceed the predetermined threshold and the predetermined period of time exceeded the expected period of time.

9. The method of claim 8 wherein the first designated area is colored a third predetermined color to reflect that the predetermined period of time did not exceed the expected period of time and the accumulated value did not exceed the predetermined threshold.

10. The method of claim 9 wherein the first designated area is colored a fourth predetermined color to reflect that the accumulated value exceeded the predetermined threshold and the predetermined period of time did not exceed the expected period of time.

11. The method of claim 6 wherein selecting a first selectable area reveals a second designated area that is visually perceptible, the second designated area identifying a plurality of subsystems and a subsystem total value for each subsystem of the plurality of subsystems, wherein the subsystem total value is equal to a sum of the numeric values for each identified message that is associated with the each subsystem of the plurality of subsystems.

12. The method of claim 11 wherein selecting a second selectable area reveals a third designated area that is visually perceptible, the third designated area identifying a plurality of the identified messages and a message value for each of the plurality of the identified messages, wherein the message value is equal to a sum of the numeric values for each occurrence of an associated identified message.

13. The method of claim 12 wherein selecting one identified message of the plurality of the identified messages in the third designated area reveals a fourth designated area that is visually perceptible, the fourth designated area identifying a date and time for each occurrence of the one identified message.

14. The method of claim 13 wherein selecting one date and time in the fourth designated area reveals a fifth designated area, the fifth designated area identifying a portion of the report stream containing at least one of the predetermined messages that is associated with the one date and time in the fourth designated area.

15. The method of claim 3 wherein the report stream is compressed when stored and decompressed prior to the step of searching.

16. The method of claim 1 wherein the predetermined messages relate to a hardware event on the switch.

17. The method of claim 16 wherein the predetermined messages relate to a hardware error on the switch.

18. The method of claim 16 wherein the predetermined messages relate to a hardware failure on the switch.

19. The method of claim 1 wherein the report stream is a serial stream of text messages.

20. An apparatus for monitoring the state of a telecommunications switch comprising:
a report memory that stores a stream of messages from the telecommunications switch to produce a stored stream of messages, wherein the stream of messages includes a plurality of messages reflecting a state of the telecommunications switch;
a processor coupled to the report memory that:
searches the stored stream of messages for predetermined messages to produce identified messages, wherein each identified message has a numerical value;
accumulates an accumulated value equal to a sum of the numeric values for each identified message; and
determines whether the accumulated value exceeds a predetermined threshold; and
a user interface that is coupled to the processor to reflect whether the accumulated value exceeds the predetermined threshold.

21. The apparatus of claim 20 wherein the report stream relates to a predetermined period of time;
wherein the processor compares the predetermined period of time to an expected period of time; and
wherein the user interface reflects whether the predetermined period of time exceeded the expected period of time.

22. The apparatus of claim 20 wherein the processor stores a date and time associated with each identified message.

23. The apparatus of claim 21 wherein the user interface includes a first designated area to reflect whether the accumulated value exceeds the predetermined threshold, wherein the first designated area is visually perceptible.

24. The apparatus of claim 23 wherein the first designated area is colored a first predetermined color to reflect that the accumulated value exceeded the predetermined threshold and the predetermined period of time exceeded the expected period of time.

25. The apparatus of claim 24 wherein the first designated area is colored a second predetermined color to reflect that the accumulated value did not exceed the predetermined threshold and the predetermined period of time exceeded the expected period of time.

26. The apparatus of claim 25 wherein the first designated area is colored a third predetermined color to reflect that the predetermined period of time did not exceed the expected period of time and the accumulated value did not exceed the predetermined threshold.

27. The apparatus of claim 26 wherein the first designated area is colored a fourth predetermined color to reflect that the predetermined period of time did not exceed the expected period of time and the accumulated value exceeded the predetermined threshold.

28. The apparatus of claim 23 wherein in response to a user selecting a first selectable area, the user interface reveals a second designated area that is visually perceptible, the second designated area identifying a plurality of subsystems and a subsystem total value for each subsystem of the plurality of subsystems, wherein the subsystem total value is equal to a sum of the numeric values for each identified message that is associated with the each subsystem of the plurality of subsystems.

29. The apparatus of claim 28 wherein in response to a user selecting a second selectable area, the user interface reveals a third designated area that is visually perceptible, the third designated area identifying a plurality of the identified messages and a message value for each of the plurality of the identified messages, wherein the message value is equal to a sum of the numeric values for each occurrence of an associated identified message.

30. The apparatus of claim 29 wherein in response to a user selecting one identified message of the plurality of the identified messages in the third designated area, the user interface reveals a fourth designated area that is visually perceptible, the fourth designated area identifying a date and time for each occurrence of the one identified message.

31. The apparatus of claim 30 wherein in response to a user selecting one date and time in the fourth designated area, the user interface reveals a fifth designated area, the fifth designated area identifying a portion of the report stream containing at least one of the predetermined messages that is associated with the one date and time in the fourth designated area.

32. The apparatus of claim 20 wherein the predetermined messages relate to a hardware event on the switch.

33. The apparatus of claim 32 wherein the predetermined messages relate to a hardware error on the switch.

34. The apparatus of claim 33 wherein the predetermined messages relate to a hardware failure on the switch.

35. The apparatus of claim 20 wherein the report stream is a serial stream of text messages.

* * * * *